July 19, 1949. J. BELADA 2,476,530
GASKET CUTTING MACHINE
Filed Feb. 12, 1947 6 Sheets-Sheet 1

Inventor
JOHN BELADA

By Rule and Hoge,
Attorneys

Inventor
JOHN BELADA

July 19, 1949.  J. BELADA  2,476,530
GASKET CUTTING MACHINE
Filed Feb. 12, 1947  6 Sheets-Sheet 3
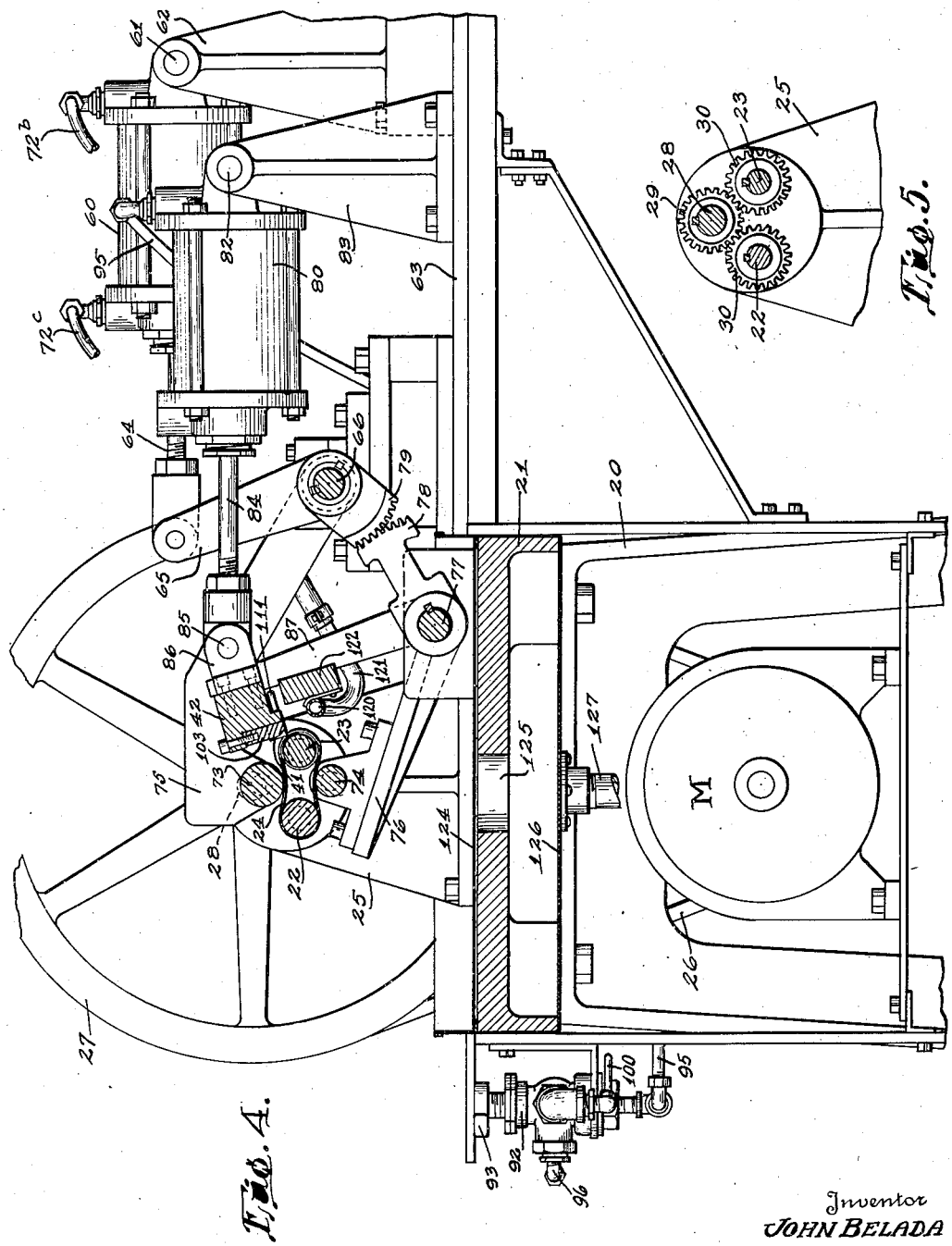
Inventor
JOHN BELADA
By Rule & Hoge
Attorneys

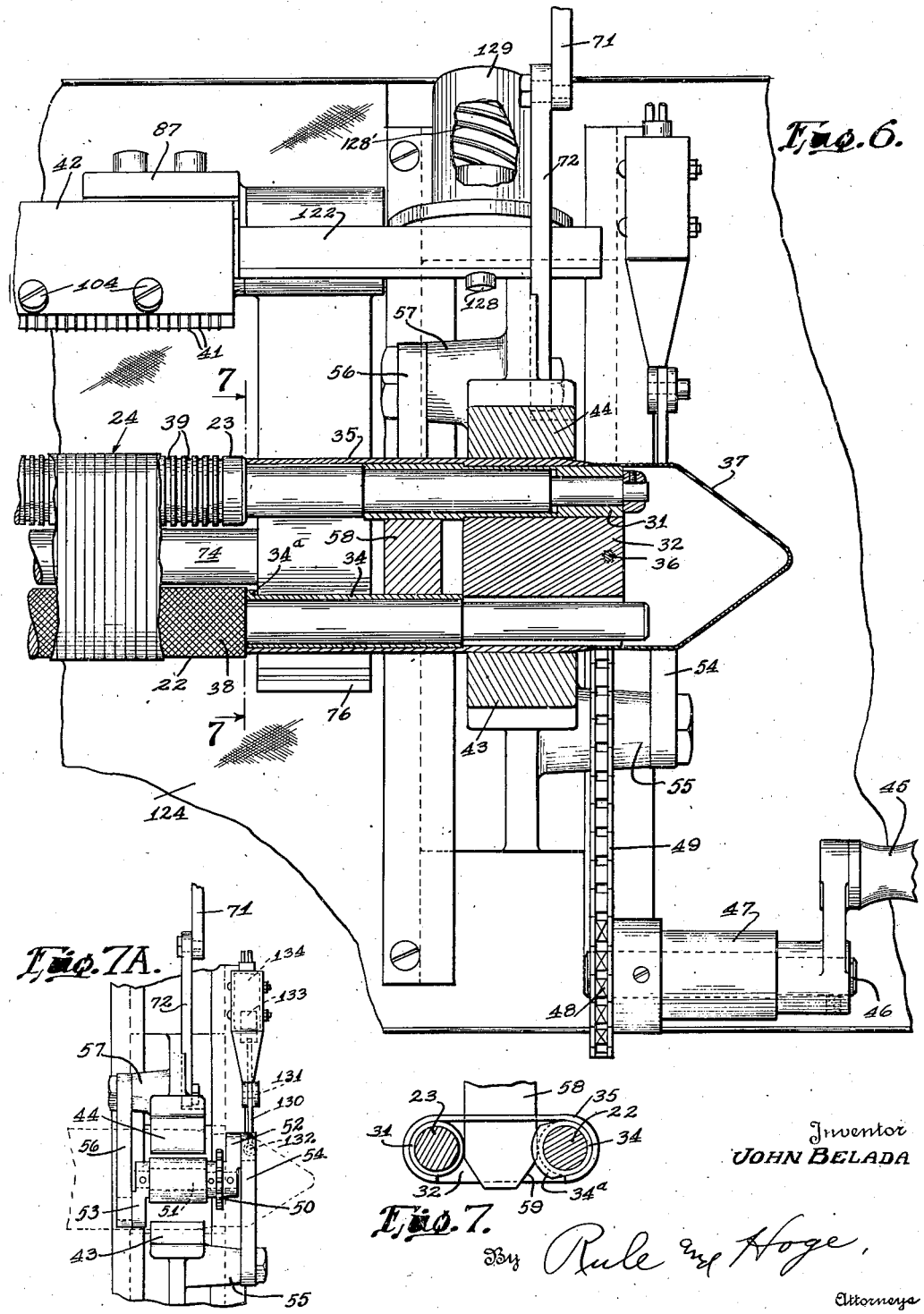

July 19, 1949.  J. BELADA  2,476,530
GASKET CUTTING MACHINE
Filed Feb. 12, 1947  6 Sheets-Sheet 5

Inventor
JOHN BELADA
By Rule & Hoge
Attorneys

July 19, 1949.  J. BELADA  2,476,530
GASKET CUTTING MACHINE
Filed Feb. 12, 1947  6 Sheets-Sheet 6

Inventor
JOHN BELADA
By Rule and Hoge
Attorneys

Patented July 19, 1949

2,476,530

UNITED STATES PATENT OFFICE 2,476,530

GASKET CUTTING MACHINE

John Belada, Glassboro, N. J., assignor to Owens-Illinois Glass Company, a corporation of Ohio Application February 12, 1947, Serial No. 728,119

15 Claims. (Cl. 164—39)

My invention relates to a machine for cutting tubes of rubber, rubber composition or other material, into a multiplicity of rings at a single operation. The invention is herein illustrated as embodied in a machine particularly adapted for cutting tubes of rubber, rubber composition or the like, into short lengths or rings for use as sealing gaskets such as are extensively used at the present day for sealing bottles, jars and other containers. The invention however, is adaptable for making other types of rings or gaskets and for various other purposes.

An object of the invention is to provide a machine or apparatus adapted for rapidly cutting a tube of rubber or the like into a multiplicity of rings in a single complete operation, thereby reducing the cost of manufacture to a fraction of the cost of making them by other known methods.

A further object of the invention is to provide an apparatus for cutting gaskets which makes it possible to control the gasket dimensions to much finer tolerances than with other means of cutting.

The invention provides means for stretching the tube on the driving rolls and holding it in a manner to insure uniform width of the rings or gaskets into which it is severed.

Other objects of the invention will appear hereinafter.

Referring to the accompanying drawings:

Fig. 4 is a part-sectional elevation similar to Figs. 2 and 3, but with the parts in the position shown during the cutting operation;

Fig. 5 is a sectional detail view showing gearing for driving the tube supporting rolls;

Fig. 6 is a fragmentary part-sectional plan view showing the outer end portions of the tube supporting and driving rolls;

Fig. 7 is a section at the line 7—7 on Fig. 6;

Fig. 7A is a fragmentary top plan view showing mechanism for moving the roll holding brackets to and from operative position;

Figure 1:
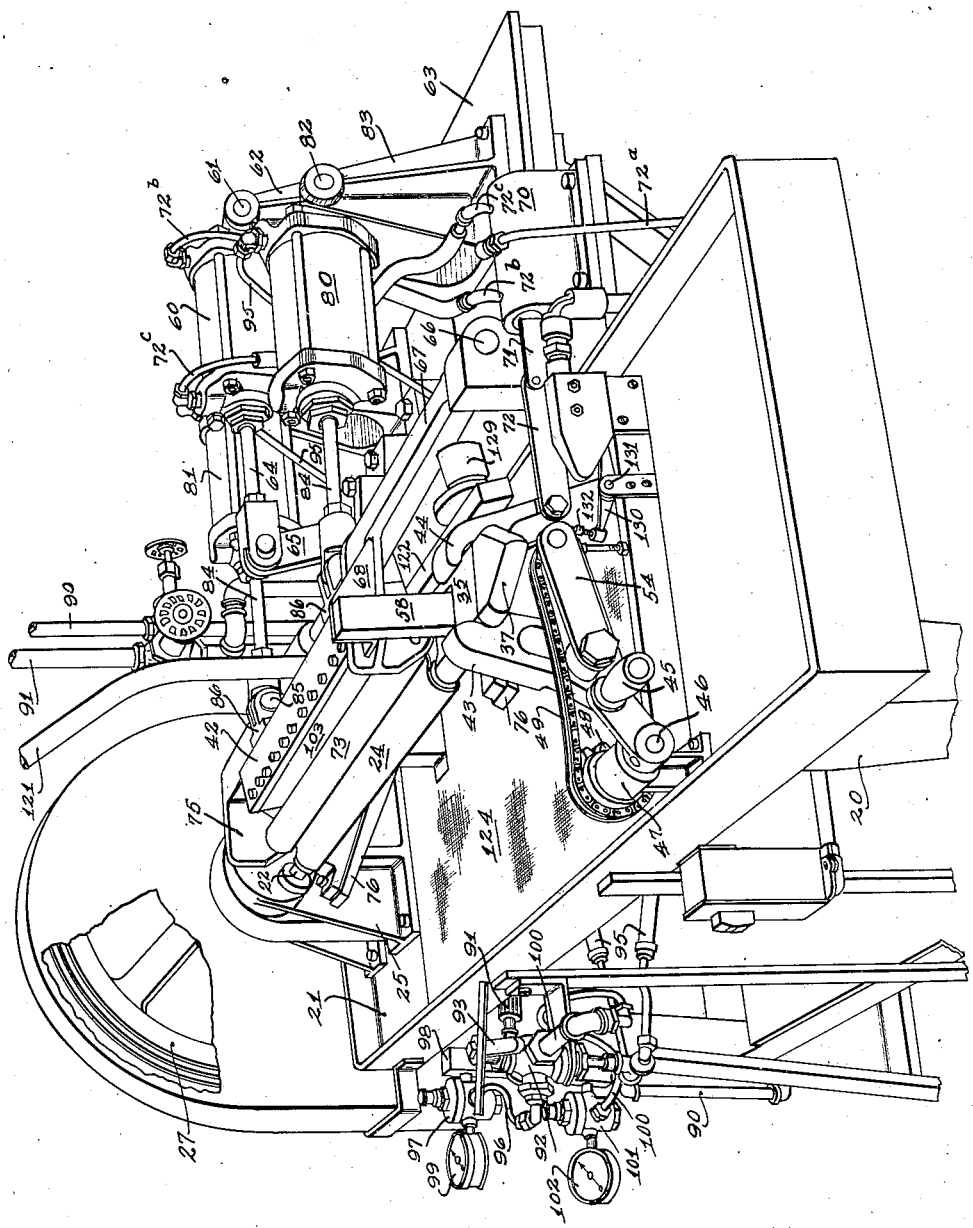
Fig. 1 is a perspective view of a machine embodying the present invention.

Referring to the drawings, the machine comprises a framework 20 with a table 21 bolted thereon. Above the table is mounted a pair of tube supporting and driving rolls or shafts 22 and 23 adapted to support and drive a tube 24 placed thereon, causing the tube to travel in a closed path surrounding the axes of the rolls while the tube is being cut into short lengths to form individual rings or gaskets. The rolls 22 and 23 are journalled at or near their rear ends in journal bearings in a standard 25 bolted to the table 21. The rolls are driven by an electric motor M (Fig. 4) having driving connections with the rolls through gearing including a belt 26 trained over a drive pulley 27 keyed to a shaft 28 (Fig. 5) journalled in the standard 25. A driving pinion 29 keyed to the shaft 28 intermeshes with gears 30 on the rolls 22 and 23 for positively driving both said rolls.

Referring to Fig. 6, the forward end portion of the roll 23 is of reduced diameter and is journalled in a tubular bearing sleeve 31 having a fixed mounting in a head or bearing block 32 carried by the rolls. The roll 22 has an end portion or spindle of reduced diameter journalled in a bearing sleeve 34. The latter is mounted for a limited horizontal movement bodily toward and from the opposite roll, the sleeve 34 being supported for such movement in a sheet metal sheath 35 (Figs. 6 and 7) which embraces the roll spindles and is attached to the bearing block 32. This movement of the bearing sleeve 34 permits the free ends of the rolls 22 and 23 to be drawn a little closer together than in their working position, to facilitate the placing of a tube thereon and the removal of the ring gaskets. The bearing sleeve 34 is formed with a rib 34ª which prevents it from rotating with the shaft 22. The outer ends of the roll spindles and head 32 are enclosed in a sheet metal cap 37 or hood attached by a screw 36 to the head 32 and tapered to guide the tube 24 onto the sheath 35 and thence into position on the rolls.

Figure 12:
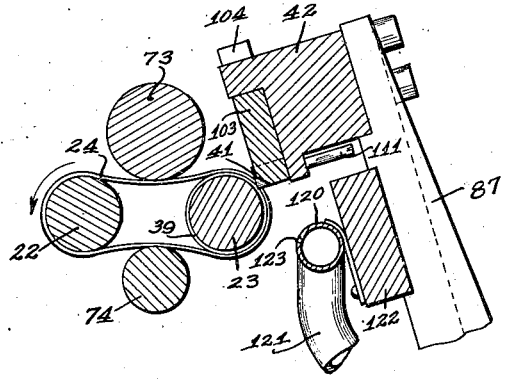
Fig. 12 is a fragmentary cross-sectional elevation view showing the tube holding and tightening rolls and cutter in operative position.

The roll 22 is formed with a knurled or roughened surface 38 to grip the workpiece or tube 24 so that said roll provides a positive drive for the tube. The roll 23 is formed at short equal intervals with circumferential grooves or recesses 39 (Figs. 6 and 12) to provide clearance between the cutter blades and the roll during the cutting operation. The blades 41 are carried on a cutter bar 42 which extends parallel with the tube supporting rolls and is mounted to swing to and from the cutting position (Fig. 4) as hereinafter described.

During the cutting operation the assembly for supporting the forward ends of the rolls 22 and 23, including the head 32, sheath 35 and the bearings for the rolls, is supported and securely held in operative position by the following mechanism. Supporting devices for the free ends of the rolls, in the form of brackets 43 and 44 at opposite sides of the roll bearings, are mounted for bodily sliding movement horizontally in a direction perpendicular to the rolls, from the open position, Fig. 2, to a closed position. In the open position of the brackets, the forward ends of the rolls are free to permit the placing of a tube thereon. In the closed position, Figs. 3 and 6, the brackets engage the sheath 35. An actuating device for sliding the brackets 43 and 44 includes a hand crank 45 keyed to a shaft 46 journalled in a bearing bracket 47. A sprocket wheel 48, keyed to the shaft 46, drives a sprocket chain 49 trained over a sprocket wheel 50 keyed to a crank shaft 51. As shown in Fig. 7A, the shaft 51 has cranks 52 and 53 keyed to its forward and rear ends respectively. The crank 52 is connected through a link 54 to a post 55 on the slide bracket 43. The crank 53 is connected through a link 56 to a post 57 on the slide bracket 44. It will be seen that when the hand crank 45 is moved forward it operates through the linkage just described to draw the brackets to the closed position (Fig. 3).

When the brackets 43, 44 are drawn together as just described, a centering bar 58 (Figs. 2, 3 and 6), formed with a tapered end 59 is swung down to a position between the bearing sleeves 31 and 34 of the rolls, thereby spreading them and holding them firmly between the bar 58 and the brackets 43, 44, in position for the cutting operation. The mechanism for swinging the bar 58 includes an air-operated piston motor 60 comprising a cylinder connected by a pivot 61 (Fig. 4) to a standard 62 mounted on a platform 63 attached to the framework 20. The piston rod 64 of the motor is pivoted to a crank 65 keyed to a rock shaft 66 journalled on the machine frame. A rock arm 67 also keyed to the shaft 66 carries the centering bar 58, the latter being connected to said arm by means of a bracket 68.

The operation of the motor 60 is under the control of a slide valve 69 (Figs. 2, 3, 13) mounted in the valve case 70. The valve stem 71 is connected through a link 72 to the sliding bracket 44. When the hand crank 45 is swung forward as above described to move the brackets 43, 44 to closed position, the bracket 44 draws the valve 69 into position to open an air pressure line 72ª (Figs. 3 and 13) to a pipe 72ᵇ for supplying air pressure behind the piston of the motor 60, thereby actuating the latter and swinging the centering bar 58 downward. The bearings for the rolls 22 and 23 are thus firmly gripped between the brackets and centering bar and held in position for the cutting operation. When the valve 69 is reversed, the air pressure line 72ª is connected to a pipe 72ᶜ for reversing the motor 60.

Tension is applied to the tube 24 by means of tension rolls 73 and 74 positioned respectively, above and below the tube. The upper tension roll 73 is journalled at its forward end in the arm 67 and at its rear end in a rock arm 75 on the rock shaft 66, so that the roll 73 swings up and down with the bar 58. The lower tension roll 74 is journalled in brackets on rock arm 76 (Figs. 1 and 4) keyed to a rock shaft 77. Keyed to the shafts 77 and 66 are gear segments 78 and 79 with intermeshing gear teeth so that when the motor 60 rocks the shaft 66 to swing the upper tension roll 73 downward, it also operates through the gear segments to swing the lower roll 74 upward, bringing the rolls into contact with the tube 24 and placing it under tension which is maintained by the air pressure in the motor 60 during the cutting operation.

The cutter bar 42 is moved to and from its operative position by a pair of air-operated piston motors 80 and 81. The motor 80 is mounted to swing on a pivot 82 on a standard 83 on the platform 63. The motor 81 is mounted in like manner. The piston rods 84 of the motors 80 and 81 are connected at their forward ends by pivots 85 to bearing brackets 86 bolted to the cutter bar 42. The latter is carried on rock arms 87 mounted to swing freely on the shaft 77.

Figure 13:
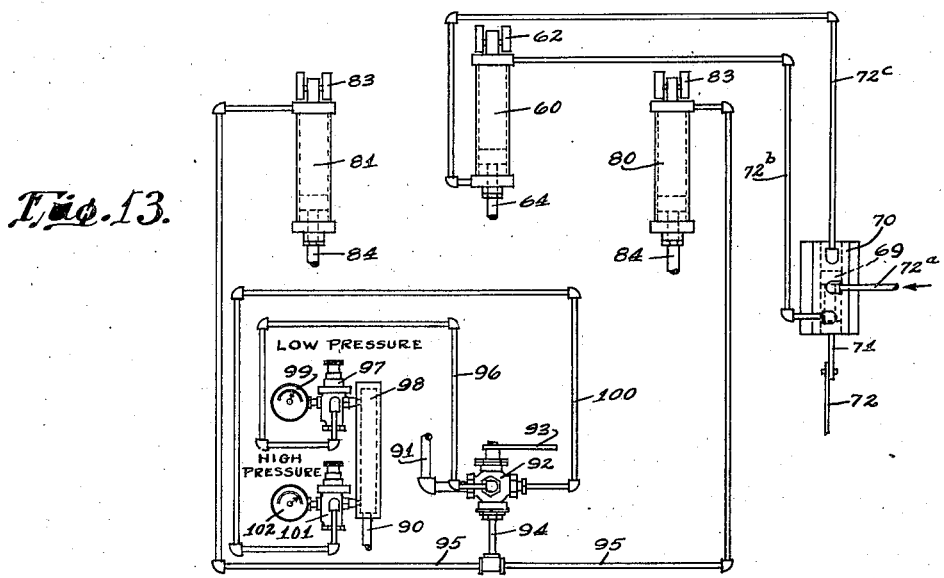
Fig. 13 is a diagrammatic view of the air motors and controls.
Figure 14:
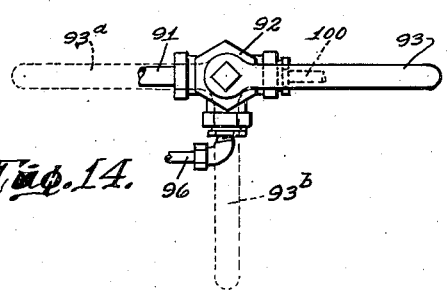
Fig. 14 is a plan view of the manual control valve.

Referring to Fig. 13, the motors 80 and 81 are operated to move the cutter bar 42 to operative position by air under pressure supplied through a pressure pipe line 90. The motors are operated in reverse by suction supplied through a vacuum pipe line 91 for withdrawing the cutter bar. The operation of the motors is under the control of a three-way valve 92 comprising a hand lever 93 (Figs. 13 and 14). When the handle 93 is in the dotted line position 93ª, Fig. 14, the suction pipe 91 is open to a pipe 94 and branch pipes 95 extending to the motor cylinders so that suction or "vacuum" is applied behind the motor pistons, thereby retracting them and withdrawing the cutter bar. When the valve lever is swung to the intermediate position 93ᵇ, the suction line 91 is cut off from the pipe 94 and the latter is opened through the valve 92 to a pipe 96 leading from the valve 92 to a pressure reducing valve 97. Air under pressure, supplied through the pipe line 90 to a manifold 98, now passes through the low pressure valve 97, and at a reduced pressure indicated by a low pressure gauge 99, is conducted through pipe 96, valve 92 and pipes 94 and 95 to the motors 80 and 81, thereby operating the motors to swing the cutter bar 92 to operative position and apply a comparatively low pressure by which the cutter blades are caused to cut into the tube 24 which is running on the rolls 22, 23. The operator then swings the valve lever from the intermediate position 93ᵇ to the full line position, Fig. 14, thereby cutting off the air supply through the pipe 96 and opening it to the pipe 100. Air under pressure is now supplied through the pipe 90 to a high pressure valve 101 and from the valve at a comparatively high pressure indicated by the high pressure gauge 102, through the pipe 100, valve 92 and thence to the motors. An increased pressure is thus applied for holding the cutters in operative position during the cutting operation.

Referring to Figs. 8 to 12, the cutter bar 42 is substantially square in cross section and includes a comparatively narrow supplemental bar or plate 103, the front face of the main bar being recessed to receive the plate 103 which is secured in position therein by screw bolts 104 and 105. The cutters 41 are each in the form of a thin, flat rectangular blade with a cutting edge 106. The blades are located in rectangular openings 112 in the plate 103 and held in place by spacing blocks 108, each formed with a screw-threaded shank 107 parallel with the lower sharpened edge 106 of the blade. The cutter bar 42 is formed with an integral rib 109 rectangular in cross section, the rib extending lengthwise of the bar and formed with openings 110 through which the shanks 107 extend. Each spacing block is secured to the cutter bar by a sleeve or nut 111 threaded on the shank 107.

Rectangular recesses or openings 112 extend upwardly from the bottom of the plate 103 at uniformly spaced intervals to receive the blades 41. Two blades are mounted in each said recess and are clamped in position against the side walls of the recesses by the blade clamping and spacing blocks 108. The recesses 112 may be somewhat wider than the intervening sections 113, the parts being so proportioned that the blades are spaced at equal intervals throughout the length of the cutter bar. The spacing blocks are bevelled or cut away along their lower front corners at 115. The sections 113 are likewise bevelled or cut away along their front corners, the bevels extending from the line 116 downward. This construction provides clearance between the cutter bar and tube when the blades cut into the tube. The spacing blocks 108 are slightly tapered as indicated at 117 so that they serve as wedges for securely clamping the blades in position when said blocks are drawn into place.

Means for supplying a lubricant to the workpieces or tubes 24 includes a tube 120 (Figs. 4 and 12) connected to a pipe 121 through which the lubricating fluid is supplied from a reservoir (not shown). The tube is mounted on the front face of a bar 122 positioned directly beneath the cutter bar 42 and extending parallel therewith. The bar 122 is attached to the rock arms which carry the cutter blade. The tube 120 is provided with jet openings 123 (Fig. 12) at short intervals throughout its length, through which a continuous spray of the lubricant is directed against the workpiece during a cutting operation. The lubricating fluid, as it drains from the workpiece falls through a screen 124 positioned over the table 21 and runs off the table through an opening 125 therethrough into a drip pan 126 beneath the table and from thence through a drain pipe 127.

When the motors 80, 81 operate to swing the cutter bar to operative position, the movement is arrested by a pair of spring buffers which cushion the blow or force with which the cutters strike the workpiece. The buffers comprise spring actuated stop pins 128 (Figs. 2, 3, 6) which are projected by springs 128' within the buffer casings 129 mounted on the bar 122. As the cutter bar moves to operative position, one of the buffer pins 128 strikes the bracket 44, as shown in the dotted line position 128ᵃ (Fig. 3). The other buffer pin may be positioned to engage the standard 25 simultaneously with the contacting of the buffer pin with the bracket 44.

Figure 2:
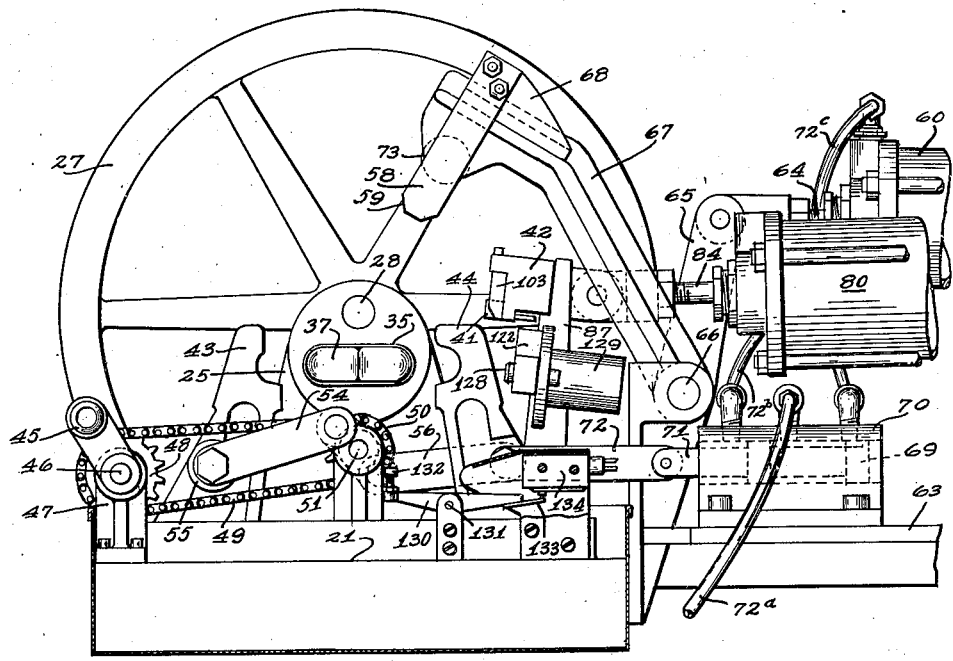
Fig. 2 is a part-sectional end elevation of the machine showing the tube holding and tightening devices in open position for placing a tube on the supporting rolls.
Figure 3:
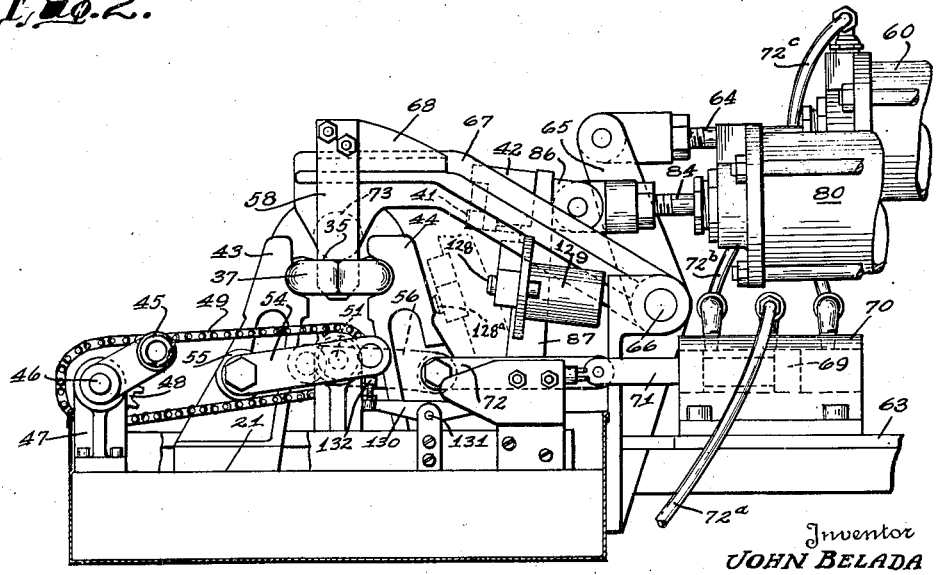
Fig. 3 is a similar view with the rolls clamped in operative position, the tube tensioned preparatory to the cutting operation.
Figure 8:
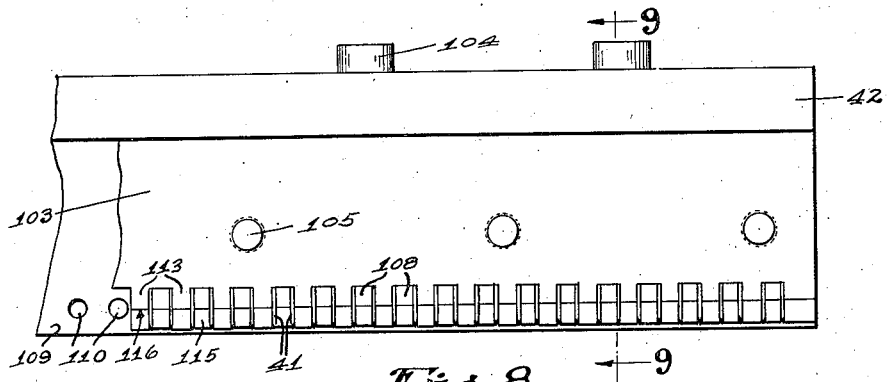
Fig. 8 is a fragmentary top plan view of the cutter bar.
Figures 9, 11:
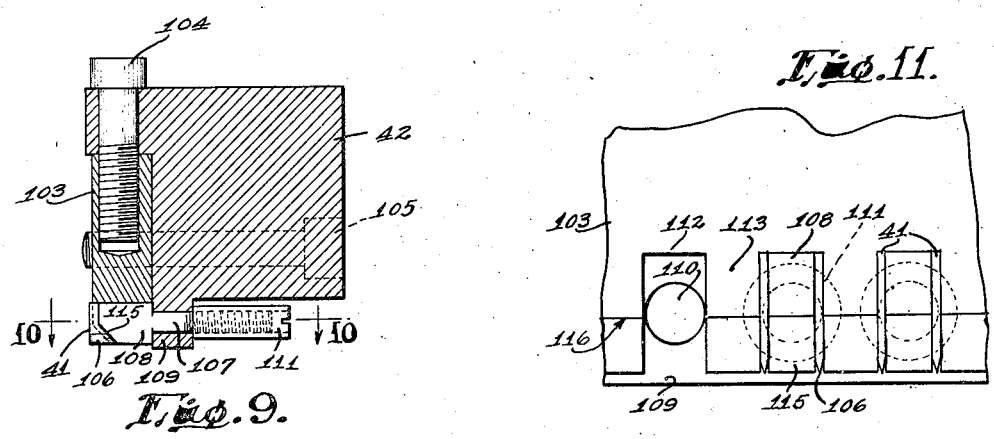
Fig. 9 is a section at the line 9—9 on Fig. 8.
Fig. 11 is a fragmentary top plan view of the cutter bar on a comparatively large scale.
Figure 10:
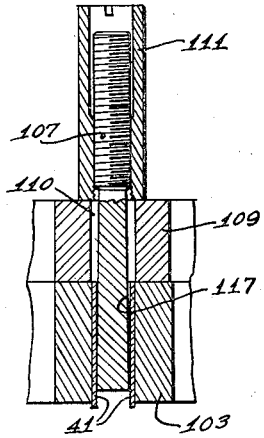
Fig. 10 is a section at the line 10—10 on Fig. 9 on a somewhat larger scale.
Figure 15:
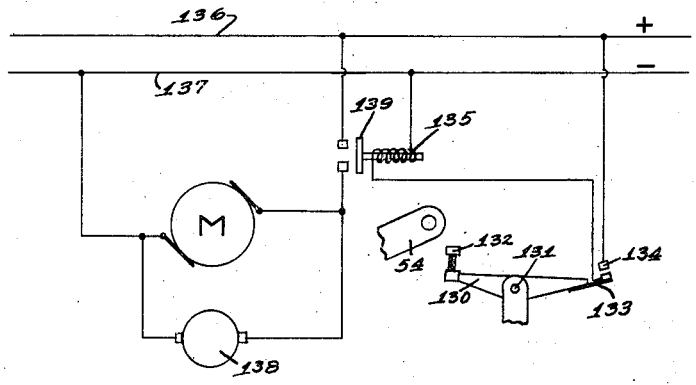
Fig. 15 is a wiring diagram of the electric motor and controls.

The mechanism for controlling the operation of the motor M (Figs. 4 and 15) is as follows:

Referring to Figs. 2, 3 and 7A, a horizontally disposed rocker 130 is mounted on the machine base for swinging movement about a pivot pin 131 and carries at one end an adjustable stop pin 132 in the path of the link 54. The opposite end of the rocker carries a switch operating contact piece 133 for closing a microswitch 134 in circuit with the coil 135 of an electromagnetic relay (Fig. 15).

The motor M which may be either an alternating current or direct current motor, is shown as a direct current motor connected across the mains 136 and 137 in a direct current system. An electromagnetic brake 138 is connected in parallel with the motor, the brake being released by current supplied thereto. When the rocker 130 is actuated to close the contacts 134, the electromagnet 135 operates the contact bar 139 to establish the motor circuit, release the brake and start the motor for the cutting operation. When the link 54 is operated to disengage the contact 132, the switch 134 is opened and the relay magnet opens the circuit for the motor and brake 138 so that the motor is quickly stopped by the brake.

*Operation*

Assuming the parts to be in the position shown in Fig. 2, with the holding brackets 43, 44 and the centering bar 58 in their retracted positions, the operator places a workpiece or tube 24 in position on the rolls 22 and 23 by slipping the tube over the tapered nose 37 and the sheath 35 by which the tube is guided onto the rolls. The operator then swings the hand crank 45 to the right thereby drawing the holding brackets 43, 44 to closed position in which they grip the sheath 35 in which the bearings for the rolls are mounted. This movement of the hand crank at the same time operates the motor control valve 69 for the air motor 60, so that the latter operates to swing the centering bar 58 downward between the roll bearings, thus spreading the rolls to operating position. The operation of the motor 60 at the same time swings the upper and lower tension rolls 73 and 74 into engagement with the tube 24, placing a tension thereon. As the hand crank 45 is completing its said movement to the right, the link 54 actuates the rocker 130 (Fig. 15) and starts the motor M for driving the rolls.

The operator then swings the valve lever 93 from the position 93ᵃ (Fig. 14) to the intermediate position 93ᵇ, thereby supplying low pressure air behind the pistons of the air motors 80 and 81, causing them to swing the cutter bar quickly forward to operative position in which the protruding corners of the blades engage the tube. As the blades are brought into contact with the workpiece, the cutter bar is arrested in its forward movement by the buffer pins 128. The spring pressure by which these pins are held projected, serves to arrest and cushion the cutter bar and prevent the knives from suddenly digging into the workpiece, being sufficient to substantially counteract the forward pressure applied by the motors 80, 81 operating under low pressure air, so that the motors apply a comparatively light, yielding pressure of the cutters against the tube. As soon as the cutter bar has been moved forward, the operator swings the lever to the right from the intermediate position 93ᵇ to the full line position (Fig. 14) for supplying air under high pressure to the motors 80 and 81 so that additional pressure is placed on the cutter bar 42, causing the blades to cut through the tubing and sever it into individual gaskets or rings while the tube is travelling on the driving rolls.

The operator then reverses the valve lever 93, thereby cutting off the pressure from the air motors 80, 81 and connecting them with the suction line 91 so that the motor pistons are withdrawn, thereby retracting the cutter bar. The hand crank 45 is also swung to the left, thus opening the electric motor circuit and applying the electromagnetic brake for quickly stopping the motor. This operation of the hand crank also spreads the brackets 43, 44 and at the same time reverses the air motor 60, causing the latter to withdraw the centering bar 58 and the tension rolls 73, 74. The withdrawal of the bar 58 leaves the roll 22 free to swing inwardly a short distance toward the roll 23, leaving the gaskets into which the tube has been severed loose on the rolls so that they may be freely withdrawn, thereby completing the cycle of operations.

Modifications may be resorted to within the spirit and scope of my invention.

I claim:

1. A machine for cutting tubes into ring gaskets, comprising a pair of parallel spaced rolls to receive a tube, means providing journal bearings near one end of the rolls in which the latter are mounted with the opposite ends of the rolls free to permit the placing of the tube thereon, supporting devices for the free ends of the rolls movable into roll supporting position after a tube is placed on the rolls, means for driving the rolls and the tube thereon, and means for severing the tube into individual ring gaskets.

2. A machine for cutting tubes into ring gaskets, comprising a pair of parallel spaced rolls to receive a tube, means providing journal bearings near one end of the rolls in which the latter are mounted with the opposite ends of the rolls free, roll supporting brackets adjacent the free ends of said rolls and spaced therefrom to permit the placing of a tube on the rolls, means for moving said brackets into roll supporting position, a cutter bar mounted to extend lengthwise of said rolls, cutters mounted on the cutter bar at short intervals therealong opposite the tube on the rolls, means for driving the rolls and causing the tube to run on the rolls, and means for moving the cutter bar bodily to and from a cutting position in which the cutters engage the running tube and sever it into individual gaskets.

3. A machine for cutting a tube into rings, comprising a pair of parallel rolls, journal bearings in which the rolls are mounted near one end of the pair, the opposite ends of the rolls being free to permit the placing of a tube thereon, holding means for the free ends of the rolls comprising roll supporting devices at opposite sides of the pair of rolls, means for moving said supporting devices toward the rolls to a roll supporting position, a spacing device mounted for movement to and from a holding position between the rolls in which it holds the rolls in operating position, and means for actuating the said spacing and roll supporting devices.

4. A machine for cutting tubes into ring gaskets, comprising a pair of rolls, means providing journal bearings in which the rolls are mounted adjacent to one end thereof with the other ends of the rolls free to permit placing of a tube thereon, bearing sleeves adjacent the free ends of the rolls in which the rolls are journalled, roll supporting devices mounted for movement to and from a roll supporting position in engagement with said bearing sleeves for supporting the rolls, an actuating device operatively connected to said roll supporting devices and movable into position to bring said supporting devices into roll supporting position, an electric motor geared to said rolls for driving the latter, and electro-responsive means operable by said actuating device for starting the motor when said roll supporting devices are moved to operative position.

5. A machine for cutting tubes of rubber or similar material into gaskets, comprising means for supporting a tube, driving means for driving the tube in a closed path, a cutter bar extending lengthwise of the tube and its supporting means, cutters mounted on said bar, the latter being mounted for bodily movement to and from a cutting position in which the cutters engage the tube, an air-operated piston motor, means providing an operating connection between the motor piston and the cutter bar for moving the latter to and from operative position, means for supplying air under a comparatively low pressure to the motor for moving the cutter bar to operative position and applying a comparatively light pressure of the cutters against the tube, and means for increasing the air pressure when the cutter bar is in operative position and thereby increasing the pressure applied to the cutters.

6. A machine for cutting tubes of rubber or similar material into gaskets, comprising means for supporting a tube, driving means for driving the tube in a closed path, a cutter bar extending lengthwise of the tube and its supporting means, cutters mounted on said bar, the latter being mounted for bodily movement to and from a cutting position in which the cutters engage the tube, an air-operated piston motor, means providing an operating connection between the motor piston and the cutter bar for moving the latter to and from operative position, an air pressure line through which air under pressure is supplied to the motor, a controlling valve controlling the air supply to the motor, pressure reducing means controlled by the valve for causing air under low pressure to be supplied to the motor for moving the cutter bar to operative position, and means for then supplying air at a comparatively high pressure to the motor and thereby increasing the pressure applied thereby to the cutter bar.

7. A machine for cutting tubes of rubber or similar material into ring gaskets, comprising a supporting roll, means for mounting the roll for rotation, means for driving the roll and a tube mounted thereon, a cutter bar extending parallel with the roll and mounted tube, a multiplicity of cutters mounted on said cutter bar at intervals therealong, said cutter bar being mounted for movement toward and from the tube for moving the cutters to and from the tube, automatic means for moving the cutter bar to operative position and applying a comparatively light yielding pressure of the cutters against the tube, and means for thereafter increasing the pressure.

8. A machine for cutting a tube of rubber or similar material into a multiplicity of ring gaskets, comprising a roll mounted for rotation and providing a support on which the tube is mounted, means for driving the roll and tube thereon, a cutter bar opposite and parallel with said roll and mounted for bodily movement to and from an operative position adjacent to the roll, a multiplicity of cutters mounted at short intervals along the cutter bar and movable with the cutter bar into engagement with the tube, power means operatively connected to the cutter bar and operable to move it to operative position and apply a comparatively light pressure of the cutters on the tube, and control means by which the pressure is thereafter increased.

9. A machine for cutting tubes of rubber or the like into rings, comprising a pair of parallel spaced rolls, means providing a mounting adjacent to one end of said pair in which the rolls are journalled for rotation, bearing sleeves adjacent to the opposite ends of the rolls and in which the latter are journalled, a sheath mounted on said bearing sleeves, means cooperating with said sheath for guiding a tube lengthwise into position on the rolls, and supporting devices mounted at opposite side of the sheath for movement to and from a position to engage and support said sheath and rolls.

10. A machine for cutting tubes of rubber or the like into rings, comprising a pair of parallel spaced rolls, means providing a mounting adjacent to one of said pair in which the rolls are journalled for rotation, bearing sleeves adjacent to the opposite ends of the rolls and in which the latter are journalled, a sheath mounted on said bearing sleeves, means cooperating with said sheath for guiding a tube lengthwise into position on the rolls, supporting devices mounted at opposite sides of the sheath for movement to and from a position to engage and support said sheath and rolls, and a spacing and centering device mounted for movement to and from a position between the said bearing sleeves for spreading and holding the rolls in the sheath.

11. A machine for cutting tubes into rings, comprising a cutter bar formed with recesses at uniformly spaced intervals lengthwise thereof and separated by intervening sections integral with the cutter bar, cutter blades mounted in said recesses, and spacing blocks individual to said recesses and mounted therein in position to clamp the blades against said intervening sections, and holding them in position in the cutter bar.

12. The combination set forth in claim 11, wherein two of said blades are mounted in each said recess with the two blades on opposite sides of and spaced apart by the spacing block.

13. A machine for cutting tubes into rings, comprising a cutter bar formed with a recess extending lengthwise thereof, a supplemental bar mounted in said recess, said supplemental bar being formed with transverse recesses and intervening sections uniformly spaced intervals lengthwise thereof, cutter blades mounted in said transverse recesses, spacing blocks removably mounted in said transverse recesses in position to clamp the blades against said intervening sections, and means individual to the spacing blocks for attaching said blocks to the said cutter bar.

14. A machine for cutting tubes into rings, comprising a cutter bar formed with a recess extending lengthwise thereof, a supplemental bar mounted in said recess, said supplemental bar being formed with transverse recesses and intervening sections uniformly spaced intervals lengthwise thereof, cutter blades mounted in said transverse recesses, spacing blocks removably mounted in said transverse recesses in position to clamp the blades against said intervening sections, said cutter bar including an integral rib extending lengthwise thereof and formed with openings therethrough, the spacing blocks being formed with screw-threaded shanks extending through said openings, and nuts threaded on said shanks and clamping the blocks to the said rib.

15. A machine for cutting tubes into rings, comprising a cutter bar formed with a rib extending lengthwise thereof, said rib formed with openings therethrough spaced at intervals lengthwise thereof, cutter blades positioned at intervals lengthwise of the rib, spacing blocks between the blades and formed with screw-threaded shanks extending through said openings, and nuts threaded on said shanks and clamping the blocks to the cutter bar.

JOHN BELADA.

REFERENCES CITED

The following references are of record in the file of this patent:

UNITED STATES PATENTS

| Number | Name | Date |
| --- | --- | --- |
| 1,318,341 | Arnold | Oct. 7, 1919 |
| 1,473,642 | Reichel | Nov. 13, 1923 |
| 1,600,726 | Freeman | Sept. 21, 1926 |
| 1,611,781 | Russell | Dec. 21, 1926 |
| 2,310,153 | Rosenfarb | Feb. 2, 1943 |

FOREIGN PATENTS

| Number | Country | Date |
| --- | --- | --- |
| 87,520 | Sweden | Oct. 6, 1936 |